(12) United States Patent
Bandou et al.

(10) Patent No.: US 11,879,210 B2
(45) Date of Patent: Jan. 23, 2024

(54) METHOD FOR PRODUCING SOFTWOOD-DERIVED PULP FIBERS FOR PAPER AND SOFTWOOD-DERIVED PULP FIBERS FOR PAPER

(71) Applicant: UNICHARM CORPORATION, Ehime (JP)

(72) Inventors: Takeshi Bandou, Kagawa (JP); Takayoshi Konishi, Kagawa (JP)

(73) Assignee: Unicharm Corporation, Ehime (JP)

( * ) Notice: Subject to any disclaimer, the term of this patent is extended or adjusted under 35 U.S.C. 154(b) by 0 days.

(21) Appl. No.: 17/530,913

(22) Filed: Nov. 19, 2021

(65) Prior Publication Data
US 2022/0074138 A1 Mar. 10, 2022

Related U.S. Application Data

(63) Continuation of application No. PCT/JP2020/016040, filed on Apr. 9, 2020.

(30) Foreign Application Priority Data

Jun. 7, 2019 (JP) .................................. 2019-107403

(51) Int. Cl.
| | | |
|---|---|---|
| D21C 9/153 | (2006.01) | |
| D21C 1/04 | (2006.01) | |
| D21C 1/08 | (2006.01) | |
| D21B 1/16 | (2006.01) | |
| D21H 11/20 | (2006.01) | |

(52) U.S. Cl.
CPC ............... *D21C 9/153* (2013.01); *D21B 1/16* (2013.01); *D21C 1/04* (2013.01); *D21C 1/08* (2013.01); *D21H 11/20* (2013.01)

(58) Field of Classification Search
CPC ........... D21C 1/08; D21C 9/153; D21C 9/007
See application file for complete search history.

(56) References Cited

U.S. PATENT DOCUMENTS

| 4,279,694 A | 7/1981 | Fritzvold et al. |
|---|---|---|
| 6,059,924 A * | 5/2000 | Hoskins ................. D21C 9/007 162/28 |
| 2005/0061455 A1 | 3/2005 | Tan et al. |
| 2005/0103458 A1 | 5/2005 | Ono et al. |
| 2015/0291762 A1 | 10/2015 | Watanabe et al. |

(Continued)

FOREIGN PATENT DOCUMENTS

| CN | 102978984 A | 3/2013 |
|---|---|---|
| CN | 106460327 A | 2/2017 |

(Continued)

OTHER PUBLICATIONS

Nanko et al., The World of Market Pulp, 2005, WOMP, p. 160-161. (Year: 2005).*

(Continued)

*Primary Examiner* — Anthony Calandra
(74) *Attorney, Agent, or Firm* — Osha Bergman Watanabe & Burton LLP

(57) ABSTRACT

A method of producing conifer-derived pulp fibers for paper includes a beating step of beating conifer-derived material pulp fibers in the presence of a liquid including water; and an ozone treatment step of treating, with ozone water, the beaten conifer-derived material pulp fibers.

8 Claims, 3 Drawing Sheets

(56) References Cited

U.S. PATENT DOCUMENTS

| | | |
|---|---|---|
| 2017/0107667 A1 | 4/2017 | Konishi et al. |
| 2019/0078259 A1 | 3/2019 | Anderson et al. |

FOREIGN PATENT DOCUMENTS

| | | | | |
|---|---|---|---|---|
| EP | 1316639 A1 | * | 6/2003 | ............. D21C 9/002 |
| EP | 3208377 A1 | * | 8/2017 | ............. A61L 11/00 |
| JP | S54-131005 A | | 10/1979 | |
| JP | 2000-282384 A | | 10/2000 | |
| JP | 2003-278087 A | | 10/2003 | |
| JP | 2004082700 A | | 3/2004 | |
| JP | 2009102797 A | | 5/2009 | |
| JP | 5624694 B2 | | 11/2014 | |
| JP | 2018048235 A | * | 3/2018 | |
| WO | 2006033605 A1 | | 3/2006 | |

OTHER PUBLICATIONS

Smook, Handbook for Pulp and Paper Technologists, 1992, Angus Wilde Publications, 2nd edition, chapter 13. (Year: 1992).*
English Machine translation of JP2018048235A from espacenet. (Year: 2018).*
International Search Report issued in corresponding International Application No. PCT/JP2020/016040 dated Jul. 14, 2020 (8 pages).
Written Opinion issued in corresponding International Application No. PCT/JP2020/016040 dated Jul. 14, 2020 (6 pages).
Notice of Reasons for Refusal issued in corresponding Japanese Application No. 2019-107403 dated Nov. 16, 2021 (8 pages).
Decision to Grant a Patent issued in corresponding Japanese Application No. 2019-107403 dated Jun. 28, 2022 (6 pages).

* cited by examiner

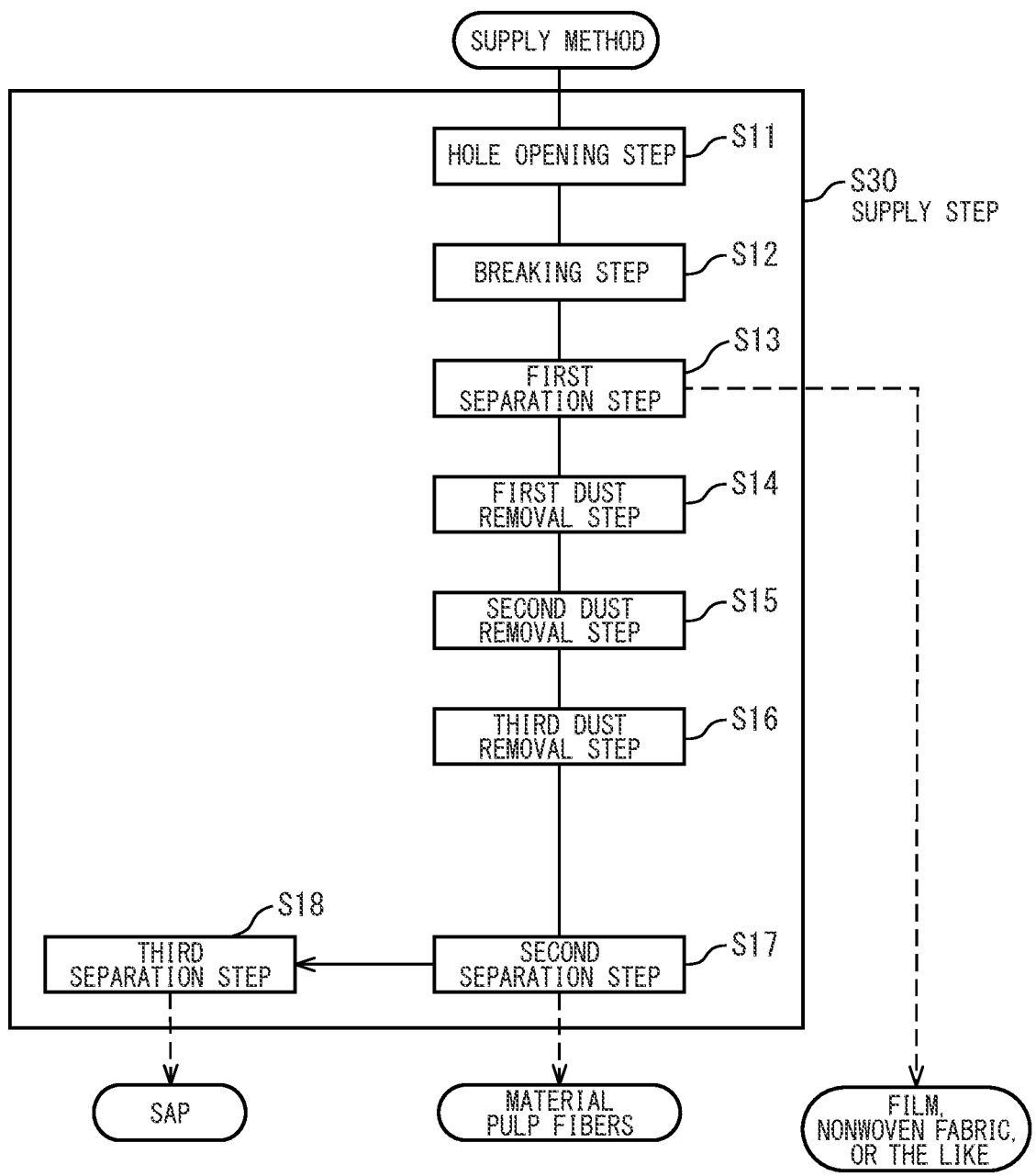

METHOD FOR PRODUCING SOFTWOOD-DERIVED PULP FIBERS FOR PAPER AND SOFTWOOD-DERIVED PULP FIBERS FOR PAPER

BACKGROUND

Technical Field

The present invention relates to a method of producing conifer-derived pulp fibers for paper and conifer-derived pulp fibers for paper.

Description of Related Art

Conifer-derived pulp fibers intended to be used for paper are known. For example, Patent Literature 1 discloses recycled fibers intended to be used for western paper or tissue paper that are recycled fibers derived from a used sanitary product (for example, paper diapers). Patent Literature 1 discloses conifer kraft pulp (NBKP) as the recycled fiber.

PATENT LITERATURE

[Patent Literature 1] Japanese Patent No. 5624694

Generally, conifer-derived pulp fibers (for example: NBKP) have a long fiber length and a long fiber width compared with hardwood-derived pulp fibers (for example: LBKP). Conifer-derived pulp fibers are, for example, approximately 3 to 5 mm in average fiber length and approximately 50 μm in average fiber width, whereas hardwood-derived pulp fibers are, for example, approximately 1 to 2 mm in average fiber length and approximately 20 μm in average fiber width. Therefore, when conifer-derived pulp fibers are used as a material of a product for which hardwood-derived pulp fibers are mainly used (for example, western paper), compared with a case where hardwood-derived pulp fibers are used, it becomes difficult to form a uniform paper sheet, and the texture or appearance of the formed paper becomes poor. Specifically, there is a risk that the surface of the paper is likely to become rough due to fluffing or the like and the tensile strength is likely to be reduced due to the thickness becoming thick even when the basis weight is the same. Therefore, as a material of a product for which hardwood-derived pulp fibers are mainly used, there is a risk that no or only a small number of conifer-derived pulp fibers are blended.

SUMMARY

One or more embodiments of the present invention provide a method of producing conifer-derived pulp fibers for paper capable of suppressing the roughening of the surface and suppressing the reduction of the tensile strength in paper produced using the conifer-derived pulp fibers, and provide conifer-derived pulp fibers for paper.

One or more embodiments of the present invention are directed to a method of producing conifer-derived pulp fibers for paper, the method comprising: a beating step of beating conifer-derived material pulp fibers in the presence of a liquid including water; and an ozone treatment step of treating the beaten material pulp fibers with ozone water.

One or more embodiments of the present invention are also directed to a fiber product comprising conifer-derived pulp fibers for paper, wherein a length-loaded average fiber length is 1.6 to 2.1 mm.

According to one or more embodiments of the present invention, it becomes possible to provide a method of producing conifer-derived pulp fibers for paper capable of suppressing the roughening of the surface and suppressing the reduction of the tensile strength in paper produced using the conifer-derived pulp fibers, and to provide conifer-derived pulp fibers for paper.

BRIEF DESCRIPTION OF THE DRAWINGS

FIG. 4 is a flow chart illustrating an example of a method of supplying conifer-derived material pulp fibers according to one or more embodiments.

DETAILED DESCRIPTION

Figure 1:
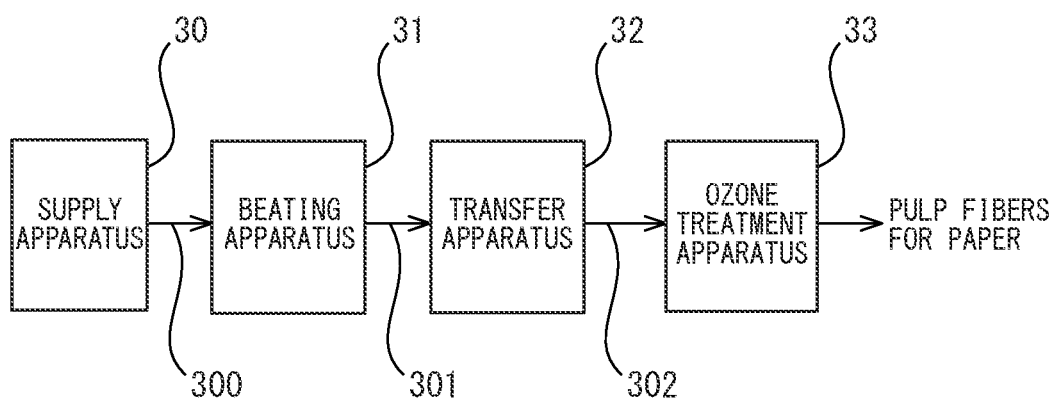
FIG. 1 is a block diagram illustrating a configuration example of a system that is used in a method of producing conifer-derived pulp fibers for paper according to one or more embodiments.

One or more embodiments of the present invention relate to the following aspects.

[Aspect 1]

A method of producing conifer-derived pulp fibers for paper, the method comprising: a beating step of beating conifer-derived material pulp fibers in the presence of a liquid including water; and an ozone treatment step of treating the beaten material pulp fibers with ozone water. In the present producing method, conifer-derived material pulp fibers are beaten, which makes it possible to fluff the surfaces of the fibers while adjusting the fiber lengths to be short. This makes it possible to facilitate lignin or other organic matters attached to the surfaces or insides of the material pulp fibers to come into contact with ozone at the time of treating the beaten material pulp fibers with ozone water. Therefore, these impurities such as lignin are oxidatively decomposed with ozone and solubilized in water, which makes it possible to easily remove these impurities from the material pulp fibers. Therefore, in the produced pulp fibers for paper, fibrillation and thinning progress, and the number of branches increases. As described above, the present producing method makes it possible to obtain synergistic effects of the beating step and the ozone treatment step such as a decrease in fiber lengths, proper removal of impurities, and a decrease in fiber thicknesses or an increase in the number of branches in the pulp fibers for paper. Therefore, when paper is manufactured using these pulp fibers for paper, fluffing of the surface of the product is suppressed, which makes it possible to facilitate smoothing of the surface, it is easy to thin the thickness even when the basis weight is the same, and the number of intersections between the fibers is dramatically increased, which makes it possible to increase the tensile strength. In other words, the present producing method makes it possible to produce conifer-derived pulp fibers for paper, which can be used as a material for high-quality paper.

[Aspect 2]

The producing method according to Aspect 1, further comprising: a transfer step of transferring the beaten material pulp fibers to the ozone treatment step together with the liquid including water used in the beating step.

In the present producing method, in the successive beating step, transfer step, and ozone treatment step, the material pulp fibers are held in the liquid containing water at all times and are thereby maintained in a wet state without being dried. Therefore, a treatment can be executed on the material pulp fibers obtained in the beating step with the ozone water in the ozone treatment step while maintaining the state of the surfaces of the material pulp fibers. This makes it possible to more reliably obtain a synergistic effect of the beating step and the ozone treatment step, which makes it possible to produce conifer-derived pulp fibers for paper that can be used as a material for high-quality paper.

[Aspect 3]

The producing method according to Aspect 1 or 2, further comprising: a supply step of supplying pulp fibers derived from a used absorbent article to the beating step as the material pulp fibers.

Generally, as the pulp fibers derived from a used absorbent article, conifer-derived pulp fibers are used. Therefore, in the present producing method, pulp fibers derived from a used absorbent article are supplied to the beating step as the conifer-derived material pulp fibers. That is, in order to reduce an environmental load, pulp fibers derived from a used absorbent article can be reused. In this case, there is a possibility that the pulp fibers derived from a used absorbent article contain excrement or superabsorbent polymers as an impurity, and there is a risk that the properties of paper may be adversely affected. However, in the present producing method, since the surfaces of the material pulp fibers are fluffed and the insides are exposed by the beating step, such impurity attached to the surfaces or insides of the material pulp fibers are easily oxidatively decomposed and solubilized in water by the ozone treatment step, which makes it possible to remove the impurity from the material pulp fibers. This makes it possible to more reliably obtain the synergistic effect of the beating step and the ozone treatment step even when pulp fibers derived from a used absorbent article are used as the material pulp fibers, which makes it possible to produce conifer-derived pulp fibers for paper that can be used as a material for high-quality paper.

[Aspect 4]

The producing method according to any one of Aspects 1 to 3, wherein the beating step includes a step of beating the material pulp fibers in the presence of an acidic aqueous solution as the liquid including water.

In the present producing method, since the material pulp fibers are beaten in the presence of an acidic aqueous solution, moisture that can remain on the surfaces or in the insides of the material pulp fibers can be made acidic. This makes it possible to make ozone less likely to be deactivated on the surfaces or in the insides of the material pulp fibers in the ozone treatment step and makes it possible to make ozone more effectively function. Therefore, the synergistic effect of the beating step and the ozone treatment step can be more reliably obtained, which makes it possible to produce conifer-derived pulp fibers for paper that can be used as a material for high-quality paper.

[Aspect 5]

The producing method according to any one of Aspects 1 to 4, wherein the beating step includes a step of beating the material pulp fibers with a conical refiner.

In the present producing method, the material pulp fibers are beaten with a conical refiner, which makes it possible to further reliably shorten the fiber lengths while fluffing the surfaces of the material pulp fibers. This makes it possible to more reliably obtain a synergistic effect of the beating step and the ozone treatment step, which makes it possible to produce conifer-derived pulp fibers for paper that can be used as a material for high-quality paper.

[Aspect 6]

The producing method according to any one of Aspects 1 to 5, wherein in the ozone treatment step, an ozone concentration of the ozone water is 1 to 200 ppm by mass, a treatment time in the ozone water is 5 to 120 minutes, and a product of the ozone concentration and the treatment time is 100 to 6000 ppm·minute.

In the present producing method, in the ozone treatment step, the ozone concentration, the treatment time, and the product of the ozone concentration and the treatment time are set to predetermined ranges, whereby lignin or other organic matters attached to the surfaces or the insides of the material pulp fibers are more reliably oxidatively decomposed and solubilized in water, which makes it possible to easily remove lignin or other organic matters from the material pulp fibers. This makes it possible to more reliably obtain a synergistic effect of the beating step and the ozone treatment step, which makes it possible to produce conifer-derived pulp fibers for paper that can be used as a material for high-quality paper.

[Aspect 7]

The producing method according to any one of Aspects 1 to 6, wherein a length-loaded average fiber length of the pulp fibers for paper after the ozone treatment step is 1.6 to 2.1 mm. In the present producing method, the length-loaded average fiber length of the pulp fibers for paper can be made as short as 1.6 to 2.1 mm. Paper is manufactured using these pulp fibers for paper, which makes it possible to exhibit an effect of suppressing the fluffing of the surface of the product or an effect of increasing the tensile strength.

[Aspect 8]

The producing method according to Aspect 7, wherein a Canadian standard freeness of the pulp fibers for paper after the ozone treatment step is 500 CSF ml or more.

Generally, the Canadian standard freeness after the beating step becomes low. In the present producing method, the Canadian standard freeness of the pulp fibers for paper can be increased to 500 ml or more by performing the ozone treatment step after the beating step. This makes it possible to increase the dehydration efficiency of the produced pulp fibers for paper.

[Aspect 9]

A fiber product comprising conifer-derived pulp fibers for paper, wherein a length-loaded average fiber length is 1.6 to 2.1 mm.

The present pulp fibers for paper are short fibers having a length-loaded average fiber length of 1.6 to 2.1 mm. Paper is manufactured using these pulp fibers for paper, fluffing of the surface of the product is suppressed, which makes it possible to facilitate smoothing of the surface, it is easy to thin the thickness even when the basis weight is the same, and the number of intersections between the fibers is dramatically increased, which makes it possible to increase the tensile strength.

[Aspect 10]

The fiber product according to Aspect 9, wherein a Canadian standard freeness of the pulp fibers for paper is 500 CSF ml or more.

In the present pulp fibers for paper, the Canadian standard freeness of the pulp fibers for paper is 500 ml or more. This makes it possible to increase the dehydration efficiency of the produced pulp fibers for paper, makes it possible to easily decrease moisture that is contained in the pulp fibers for paper (for example: a moisture rate of 50% or less), and makes it possible to enhance the transport efficiency as a material.

[Aspect 11]

The fiber product according to Aspect 9 or 10, wherein the fiber product is hand-made paper manufactured by setting a blending amount of the pulp fibers for paper to 90 mass % or more, and the hand-made paper has a density of 300 kg/m³ or higher, a maximum elongation degree of 5% or higher, and a tensile strength of 35 N/25 mm or higher.

In the present pulp fibers for paper, hand-made paper manufactured by setting the blending amount of the pulp fibers for paper to 90 mass % or more can be made to have a high density (300 kg/m³ or higher), a high elongation (5% or higher), and a high tensile strength (35 N/25 mm or higher). That is, pulp fibers for paper that can be used as a material for high-quality paper can be obtained.

Hereinafter, a method of producing conifer-derived pulp fibers for paper and conifer-derived pulp fibers for paper according to one or more embodiments will be described.

In one or more embodiments, "paper" is a thin piece manufactured with a paper machine or by manual using pulp fibers as a material, and examples thereof include western paper, Chinese paper, Japanese paper, and the like. "Pulp fiber" refers to a cellulose fiber extracted by chemically and/or mechanically treating wood or other plants and a cellulose fiber that has been used at least once and then reused. "Conifer-derived" refers to the fact that, regardless of subsequent treatment or the like, a material such as a pulp fiber was originally included in a conifer. "Being derived from an absorbent article" refers to the fact that, regardless of subsequent treatment or the like, a material such as a pulp fiber was originally included in the absorbent article. It should be noted that "conifer-derived" and "being derived from an absorbent article" are compatible.

Figure 2:
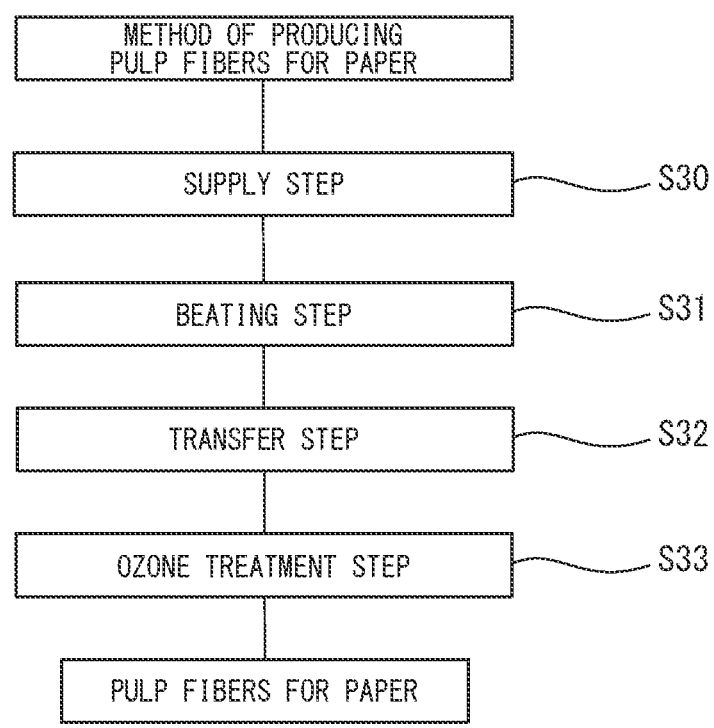
FIG. 2 is a flow chart illustrating an example of a method of producing conifer-derived pulp fibers for paper according to one or more embodiments.

FIG. 1 is a block diagram illustrating a configuration example of a system 1 that is used in the method of producing conifer-derived pulp fibers for paper according to one or more embodiments. FIG. 2 is a flow chart illustrating an example of the method of producing conifer-derived pulp fibers for paper according to one or more embodiments.

The method of producing conifer-derived pulp fibers for paper includes a beating step S31 and an ozone treatment step S33 and may further include a supply step S30 and/or a transfer step S32. Incidentally, the system 1 that is used in the method of producing conifer-derived pulp fibers for paper includes a beating apparatus 31 and an ozone treatment apparatus 33 and may further include a supply apparatus 30 and/or a transfer apparatus 32. Hereinafter, each step (each apparatus) will be specifically described.

The supply step S30 is executed with the supply apparatus 30. In the supply step S30, material pulp fibers are prepared and supplied to the beating step S31.

The material pulp fibers are conifer-derived pulp fibers and pulp fibers that serve as raw materials for producing pulp fibers for paper by the producing method according to one or more embodiments. Examples of the material pulp fibers include conifer-derived virgin pulp fibers, that is, pulp fibers that have been produced as pulp fibers but are not used. In such a case, examples of the supply apparatus 30 includes an apparatus that receives virgin pulp fibers prepared outside the system 1 and supplies the virgin pulp fibers to the beating step S31 and an apparatus that produces pulp fibers from, for example, softwood of a conifer. Alternatively, examples of the material pulp fibers include conifer-derived recycled fibers, that is, pulp fibers that have been used at least once as materials of an absorbent body or paper of an absorbent article and then recycled for reuse. In such a case, examples of the supply apparatus 30 include an apparatus that receives recycled fibers prepared outside the system 1 and supplies the recycled fibers to the beating step S31 and an apparatus that recycles pulp fibers used at least once for reuse. Particularly, in a case where the material pulp fibers are pulp fibers used in an absorbent article, that is, pulp fibers derived from a used absorbent article, the supply step S30 includes a step of recycling the pulp fibers derived from a used absorbent article, and the supply apparatus 30 includes an apparatus that embodies that step.

Material pulp fibers 300 that are supplied from the supply step S30 are supplied to the beating step S31 (beating apparatus 31).

The beating step S31 is executed with the beating apparatus 31. In the beating step S31, the conifer-derived material pulp fibers 300 are beaten in the presence of a liquid containing water. In the beating step S31, in the material pulp fibers 300, the pulp fibers are cut such that the fiber lengths thereof become short, and the pulp fibers are mechanically ground to be branched in a branch shape (fibrillated). This makes the insides of the material pulp fibers 300 exposed and increases the specific surface area.

In the beating step S31, the concentration of the material pulp fibers 300 that are contained in the liquid containing water is, for example, 1 to 20 mass % and preferably 2 to 10 mass % with respect to 100 mass % of the liquid. When the concentration of the material pulp fibers 300 is too low, the material pulp fibers 300 are not easily beaten, and, when the concentration is too high, the material pulp fibers 300 are likely to be unevenly beaten.

The liquid containing water contains water and is not particularly limited as long as the beating apparatus 31 or the material pulp fiber 300 is not affected (damaged or the like) and examples thereof include water and an acidic aqueous solution. In the case of using an acidic aqueous solution, the acidic aqueous solution is capable of reaching the surfaces or insides of the material pulp fibers 300 and remaining thereon. Therefore, when the material pulp fibers are treated with ozone in the subsequent ozone treatment step S33 (described below), the acidic aqueous solution remaining on the surfaces or insides makes it possible to make the ozone that has reached the surfaces or insides less likely to be deactivated and makes it possible to make the function of the ozone sufficiently exhibited. In addition, in a case where the material pulp fibers 300 are pulp fibers derived from a used absorbent article, superabsorbent polymers attached to the pulp fibers can be easily inactivated with the acidic aqueous solution, and then the inactivated superabsorbent polymers can be easily oxidatively decomposed with the ozone, solubilized, and removed. As the acidic aqueous solution, an acidic aqueous solution that is exemplified as an example of an inactivation aqueous solution described below can be used. The acidic aqueous solution has a predetermined pH that is acidic (lower than 7.0) and preferably lower than 7.0. The upper limit of the pH is preferably 4.0 and more preferably 3.5.

The specific configuration of the beating apparatus 31 that executes the beating step S31 is not particularly limited as long as the material pulp fibers can be beaten. Examples of the beating apparatus 31 include a conical refiner, and specific examples thereof include beatfiner (manufactured by Satomi Corp.). The blade pattern of the beatfiner changes depending on the intended use of the beatfiner (cutting or fibrillation of the material pulp fibers). In one or more embodiments, since the intended use is mainly the cutting of the material pulp fibers, a blade pattern in which the angle is shallow and the blade width/groove width is wide is used. Specifically, the blade width, the groove width, and the angle are, for example, 2 to 5 mm, 3 to 10 mm, and 8° to 18°, respectively. The rotation speed is, for example, 600 to 1000 rpm. The conical refiner easily shortens the fiber lengths by cutting the pulp fibers. Therefore, the conical refiner is capable of making relatively long fiber lengths relatively short in the conifer-derived pulp fibers. This makes it possible to suppress the surface of paper manufactured using the pulp fibers fluffing or the thickness becoming thick when the basis weight is the same.

The temperature at which the beating step S31 is executed is not particularly limited and is, for example, room temperature (25° C.) and preferably 10° C. to 40° C. The number of times of the material pulp fibers passing through the beatfiner is, for example, 1 to 6 and preferably 2 to 4. The pressure is, for example, 0.07 to 0.11 MPa.

The material pulp fibers 300 beaten in the beating step S31 become material pulp fibers 301 which have shortened fiber lengths, are fibrillated, and have increased specific surface areas.

The transfer step S32 is executed with the transfer apparatus 32. In the transfer step S32, the material pulp fibers 301 beaten in the beating step S31 are transferred to the ozone treatment step S33 as material pulp fibers 302 together with the liquid containing water used in the beating step S31. Here, when the pulp fibers are dried during transfer, there is a risk that branches are torn off or branches are reattached to each other. Therefore, in the transfer step S32, the material pulp fibers 302 are continuously held in the liquid containing water and are transferred from the beating step S31 to the ozone treatment step S33 while maintaining the wet state, which makes it difficult for branches to be torn off and makes it possible to transfer the material pulp fibers 302 while maintaining a fibrillated state.

Examples of the transfer apparatus 32 include a liquid delivery pump capable of delivering the liquid containing the material pulp fibers 302. The transfer apparatus 32 is disposed, for example, in the middle of a pipe that communicates the beating apparatus 31 and the ozone treatment apparatus 33. The transfer apparatus 32 may be included in the beating apparatus 31 or the ozone treatment apparatus 33, and thus the transfer apparatus 32 may not be present as a separate apparatus from the beating apparatus 31 or the ozone treatment apparatus 33.

The ozone treatment step S33 is executed with the ozone treatment apparatus 33. In the ozone treatment step S33, the beaten material pulp fibers 301, that is, the transferred material pulp fibers 302 are treated with ozone water. The treatment of the material pulp fibers 302 with ozone water makes it possible to bring lignin or other organic matters attached to the surfaces or insides of the material pulp fibers 302 into contact with ozone. Therefore, impurities such as lignin are oxidatively decomposed with ozone and solubilized in the liquid containing water, which makes it possible to easily remove the impurities from the material pulp fibers 302 and makes it possible for fibrillation to progress. Due to that, in the material pulp fibers 302, the fibrillation further progresses, and the specific surface area further increases.

Particularly, in a case where the material pulp fibers 302 are held in the liquid and transferred while maintaining the wet state in the transfer step S32, the material pulp fibers 302 are transferred while maintaining the state where the material pulp fibers 302 have been branched in a branch shape and fibrillated and the specific surface area has increased in the beating step S31. This makes it possible to facilitate the material pulp fibers 302 to come into contact with ozone in a wider region, makes it possible to more easily remove the impurities, and makes it possible to further accelerate the fibrillation.

In addition, in a case where pulp fibers derived from a used absorbent article are used as the material pulp fibers 300, the following effects can be further exhibited by the ozone treatment step. That is, in addition to the acceleration of the fibrillation and an increase in the specific surface area, the impurities such as excrement or the superabsorbent polymers attached to the surfaces or insides of the material pulp fibers 302 can be easily oxidatively decomposed, solubilized in water, and removed from the material pulp fibers 302. This makes sterilization and bleaching possible.

In the ozone treatment step S33, the concentration of the material pulp fibers 302 that are contained in the ozone water is, for example, 1 to 20 mass % and preferably 2 to 10 mass % with respect to 100 mass % of the ozone water. When the concentration of the material pulp fibers 302 is too low, the pulp fibers are easily damaged, and, when the concentration is too high, impurities in the material pulp fibers 302 are not easily removed.

In the ozone treatment step S33, the ozone concentration in the ozone water is preferably 1 to 200 ppm by mass. When the concentration is too low, the impurities in the material pulp fibers 302 are not easily removed, and, when the concentration is too high, the pulp fibers are easily damaged. In addition, the treatment time with ozone is short when the ozone concentration in the ozone water is high, is long when the ozone concentration is low, and is typically 5 to 120 minutes. The product of the ozone concentration (ppm) in the ozone water and the treatment time (minutes) (hereinafter, also referred to as "CT value") is preferably 100 to 6000 ppm·minute. When the CT value is too small, the impurities are not easily removed, and, when the CT value is too high, the pulp fibers are easily damaged.

In the ozone treatment step S33, in order to evenly progress a reaction, the ozone water containing the material pulp fibers 300 may be stirred. In the ozone treatment step S33, the temperature of the ozone water is not particularly limited and is, for example, room temperature (25° C.) and preferably 10° C. to 40° C. When the temperature is too low, the progress of the reaction by ozone becomes slow, and, when the temperature is too high, ozone in the ozone water is likely to escape as gas, which makes the reaction by ozone difficult to occur.

It should be noted that, in the ozone treatment step S33, the ozone water containing ozone is used, but a different oxidizing agent capable of removing the impurities attached to the surfaces or insides of the material pulp fibers 302 may be jointly used with ozone or may be used singly. Examples of such an oxidizing agent include hydrogen peroxide and peracetic acid.

The ozone water is not particularly limited as long as the ozone water contains water containing ozone, and examples thereof include water or an acidic aqueous solution. In the case of using an acidic aqueous solution, the deactivation or gasification of ozone in the ozone water can be suppressed. This makes it possible to facilitate ozone to reach the surfaces or insides of the material pulp fibers 302 and makes it possible to sufficiently exhibit the function of ozone on the surfaces or insides of the material pulp fibers 302. That is, lignin or other organic matters on the surfaces or in the insides of the material pulp fibers 302 can be oxidatively decomposed, solubilized, and removed by ozone in the acidic aqueous solution. In addition, in a case where the material pulp fibers 300 are pulp fibers derived from a used absorbent article, the acidic aqueous solution is capable of inactivating the superabsorbent polymers attached to the material pulp fibers 302. Therefore, the superabsorbent polymers attached to the material pulp fibers 302 can be easily oxidatively decomposed, solubilized, and removed together with excrement and other organic matters by ozone. As the acidic aqueous solution, an acidic aqueous solution that is exemplified as an example of an inactivation aqueous solution described below can be used. The acidic aqueous solution has a predetermined pH that is acidic (lower than 7.0) and preferably lower than 7.0. The upper limit of the pH is preferably 4.0 and more preferably 3.5.

Particularly, in a case where an acidic aqueous solution is used in the beating step S31 and the acidic aqueous solution is supplied to the ozone treatment step S33 through the transfer step S32 together with the material pulp fibers 301, the acidic aqueous solution used in the beating step S31 can be used as water for the ozone water. In such a case, in the ozone treatment step S33, ozone (gas) is supplied to the acidic aqueous solution to generate ozone water, and this ozone water is used. The acidic aqueous solution can be made present on the surfaces or in the insides of the material pulp fibers 302.

The specific configuration of the ozone treatment apparatus 33 for the ozone treatment step S33 is not particularly limited as long as the material pulp fibers 302 can be brought into contact with (or immersed in) the ozone water. The ozone treatment apparatus 33 includes, for example, a treatment tank that stores the ozone water and an ozone supply apparatus that supplies ozone into the treatment tank. In the ozone treatment apparatus 33, for example, the material pulp fibers 302 are put into the treatment tank from the upper part or lower part of the treatment tank, ozone is supplied into the treatment tank from the lower part of the treatment tank, and the material pulp fibers 302 and the ozone water are mixed together and brought into contact with each other in the treatment tank. The ozone water may be generated in the treatment tank by the mixing of a liquid containing water and ozone (gas) in the treatment tank. Examples of an ozone generation apparatus include an ozone water exposure tester ED-OWX-2 manufactured by Ecodesign Co., Ltd., an ozone generation apparatus OS-25V manufactured by Mitsubishi Electric Corporation, and the like.

After that, the ozone treated material pulp fibers 302 are separated from the ozone water (solid-liquid separation) with a sieve (or mesh) provided in the ozone treatment apparatus 33 and dehydrated as necessary. This generates conifer-derived pulp fibers for paper.

It should be noted that a drying step may be provided after the ozone treatment step S33. In the drying step, for example, the conifer-derived pulp fibers for paper are dried by blowing a dry air. The drying temperature is, for example, room temperature (for example, 25° C.) to 150° C. and preferably 70° C. to 120° C. When the drying temperature becomes low, the drying time is likely to become long, and, when the drying temperature becomes high, the pulp fibers for paper are likely to be damaged. In the drying step, the drying time may be, for example, 30 to 300 minutes.

In the method of producing conifer-derived pulp fibers for paper of one or more embodiments, first, in the beating step S31, the conifer-derived material pulp fibers 300 are beaten, which makes it possible to fluff the surfaces of the pulp fibers and to fibrillate the pulp fibers while adjusting the fiber lengths to become short. Therefore, after that, in the ozone treatment step S33, lignin or other organic matters attached to the surfaces or insides of the material pulp fibers 302 can be made easy to come into contact with ozone at the time of treating the beaten material pulp fibers 302 with the ozone water. This makes these impurities such as lignin oxidatively decomposed with ozone and solubilized in water, which makes it possible to easily remove these impurities from the material pulp fibers 302. Additionally, fibrillation is further accelerated. Due to that, in the produced pulp fibers for paper, fibrillation and thinning progress, the number of branches increases, and the specific surface area increases. As described above, the present producing method makes it possible to obtain synergistic effects of the beating step and the ozone treatment step such as a decrease in fiber lengths, proper removal of impurities, and a decrease in fiber thicknesses or an increase in the number of branches, which increases the specific surface area in the pulp fibers for paper. Therefore, when paper is manufactured using these pulp fibers for paper, fluffing of the surface of the product is suppressed, which makes it possible to facilitate smoothing of the surface, it is easy to thin the thickness even when the basis weight is the same, and the number of intersections between the fibers is dramatically increased, which makes it possible to increase the tensile strength. In other words, the present producing method makes it possible to produce conifer-derived pulp fibers for paper, which can be used as a material for high-quality paper.

In one or more embodiments of the present invention, in the successive beating step S31, transfer step S32, and ozone treatment step S33, the material pulp fibers 301 and 302 are held in the liquid containing water at all times and thereby maintained in a wet state without being dried. Therefore, the treatment of the material pulp fibers 302 with the ozone water can be executed in the ozone treatment step S33 while maintaining the state of the surfaces of the material pulp fibers 301 (for example, a state where the material pulp fibers 301 are branched and fibrillated) obtained in the beating step S31. This makes it possible to more reliably obtain a synergistic effect of the beating step S31 and the ozone treatment step S33, which makes it possible to produce conifer-derived pulp fibers for paper that can be used as a material for high-quality paper.

In one or more embodiments of the present invention, since the material pulp fibers 300 are beaten in the presence of the acidic aqueous solution, moisture that can remain on the surfaces or in the insides of the material pulp fibers 300 can be made acidic. This makes it possible to make ozone less likely to be deactivated on the surfaces or in the insides of the material pulp fibers 300 in the subsequent ozone treatment step S33 and makes it possible to make ozone more effectively function. Therefore, the synergistic effect of the beating step S31 and the ozone treatment step S33 can be more reliably obtained, which makes it possible to produce conifer-derived pulp fibers for paper that can be used as a material for high-quality paper.

In one or more embodiments of the present invention, the material pulp fibers 300 are beaten with a conical refiner, which makes it possible to further reliably shorten the fiber lengths while fluffing the surfaces of the material pulp fibers 300. This makes it possible to more reliably obtain a synergistic effect of the beating step S31 and the ozone treatment step S33, which makes it possible to produce conifer-derived pulp fibers for paper that can be used as a material for high-quality paper.

In one or more embodiments of the present invention, in the ozone treatment step, the ozone concentration, the treatment time, and the product of the ozone concentration and the treatment time are set to predetermined ranges, whereby lignin or other organic matters attached to the surfaces or the insides of the material pulp fibers 302 are more reliably oxidatively decomposed and solubilized in water, which makes it possible to easily remove lignin or other organic matters from the material pulp fibers 302. This makes it possible to more reliably obtain a synergistic effect of the beating step S31 and the ozone treatment step S33, which makes it possible to produce conifer-derived pulp fibers for paper that can be used as a material for high-quality paper.

In one or more embodiments of the present invention, the length-loaded average fiber length of the pulp fibers for paper can be made as short as 1.6 to 2.1 mm. Paper is manufactured using these pulp fibers for paper, which makes it possible to exhibit an effect of suppressing the fluffing of the surface of the product or an effect of increasing the tensile strength.

In one or more embodiments of the present invention, the ozone treatment step S33 is performed after the beating step S31, which makes it possible to increase the Canadian standard freeness of the pulp fibers for paper, which is likely to become low after the beating step, to 500 ml or more. This makes it possible to increase the dehydration efficiency of the produced pulp fibers for paper.

When the length-loaded average fiber length of the material pulp fibers 300 is approximately 2.2 to 2.6 mm, the length-loaded average fiber length of the generated pulp fibers for paper is, for example, approximately 1.6 to 2.1 mm and preferably 1.8 to 2.0 mm. Paper is manufactured using these pulp fibers for paper, which makes it possible to exhibit an effect of suppressing fluffing of the surface of the product and making it possible to facilitate smoothing of the surface or an effect of facilitating the thickness to be thinned even when the basis weight is the same and dramatically increasing the number of intersections between the fibers, which makes it possible to increase the tensile strength. In other words, the length-loaded fiber length is set to a value between those of conifer kraft pulp and hardwood kraft pulp, which makes it possible to embody the enhancement of the tensile strength of paper due to an appropriately long length-loaded average fiber length and suppression of fluffing due to an appropriately short length-loaded average fiber length.

When the Canadian standard freeness of the material pulp fibers 300 is approximately 700 to 800 CSF ml, the Canadian standard freeness of pulp fibers for paper to be generated is, for example, 500 CSF ml or more, preferably approximately 500 to 700 CSF ml and more preferably approximately 550 to 650 CSF ml. This makes it possible to increase the dehydration efficiency of the produced pulp fibers for paper. In addition, moisture that is contained in the pulp fibers for paper can be decreased (for example: a moisture rate of 50% or less), and the transport efficiency as a material can be enhanced.

Hand-made paper (i.e., a fiber product) manufactured by setting the blending amount of generated pulp fibers for paper to 90 mass % or more has a density of 300 kg/m$^3$ or higher (basis weight: 52 g/m$^2$ or more, thickness: 0.17 mm or less), a maximum elongation degree of 5% or higher, and a tensile strength of 35 N/25 mm or higher. That is, paper having a high tensile strength can be produced.

Next, as another aspect of one or more embodiments, a case where the material pulp fibers 300 are pulp fibers used in an absorbent article, that is, pulp fibers derived from a used absorbent article will be described. In this aspect, the supply step S30 is a step of separating pulp fibers from a used absorbent article and supplying the pulp fibers as the material pulp fibers 300, and the supply apparatus 30 is an apparatus that embodies the step.

First, the used absorbent article will be described. The used absorbent article refers to an absorbent article used by a user and includes an absorbent article in a state of having absorbed and held user's excrement and an absorbent article that has been used but does not absorb and hold any excrement or an absorbent article that has not been used, but discarded. Examples of the absorbent article include a paper diaper, an incontinence pad, a sanitary napkin, a bed sheet, and a pet sheet, and the absorbent article includes pulp fibers and may include superabsorbent polymers.

Next, a configuration example of the absorbent article will be described. The absorbent article includes a top sheet, a back sheet, and an absorbent body arranged between both sheets. The size of the absorbent article is, for example, approximately 15 to 100 cm in length and 5 to 100 cm in width. The absorbent article may further include a different member that ordinary absorbent articles include, for example, a diffusion sheet, leakproof walls, side sheets, or the like.

Examples of a configuration member of the top sheet include a liquid-permeable nonwoven fabric, a synthetic resin film having a liquid-permeating hole, a composite sheet thereof, and the like. Examples of a configuration member of the back sheet include a liquid-impermeable nonwoven fabric, a liquid-impermeable synthetic resin film, and a composite sheet thereof. Examples of a configuration member of the diffusion sheet include a liquid-permeable nonwoven fabric. Examples of a configuration member of the leakproof wall or the side sheet include a liquid-impermeable nonwoven fabric, and the leakproof wall may include an elastic member such as rubber thread. The material of the nonwoven fabric or the synthetic resin film is not particularly limited as long as the material can be used as absorbent articles, and examples thereof include an olefin-based resin such as polyethylene or polypropylene, a polyamide-based resin such as 6-nylon or 6,6-nylon, a polyester-based resin such as polyethylene terephthalate or polybutylene terephthalate, and the like. As the material of the nonwoven fabric, a natural fiber such as cotton or rayon may be used. In one or more embodiments, an absorbent article for which a film is used as the back sheet and a nonwoven fabric is used as the top sheet material will be described as an example.

Examples of the configuration member of the absorbent body include pulp fibers and superabsorbent polymers. Examples of the pulp fiber include a conifer-derived pulp fiber. Examples of the conifer-derived pulp fiber include a chemical pulp such as kraft pulp, soda pulp, and sulfite pulp, a mechanical pulp such as groundwood pulp, a chemical-mechanical pulp such as chemiground pulp and semichemical pulp. As the sizes of the conifer-derived pulp fibers, the average value of the long diameters of the fibers is, for example, 20 to 50 μm, and the average value of the fiber lengths is, for example, 2 to 5 mm. The superabsorbent polymers (SAP) are not particularly limited as long as the superabsorbent polymers can be used as an absorbent article.

One surface and the other surface of the absorbent body are joined to the top sheet and the back sheet, respectively, via an adhesive. In a plan view, a portion (peripheral portion) of the top sheet which extends to an outer side of the absorbent body so as to surround the absorbent body is bonded to a portion (peripheral portion) of the back sheet which extends to an outer side of the absorbent body to surround the absorbent body via an adhesive. Therefore, the absorbent body is wrapped inside the joined body of the top sheet and the back sheet. The adhesive is not particularly limited as long as the adhesive can be used as an absorbent article, and examples thereof include a hot-melt adhesive.

Next, the supply step S30 of separating pulp fibers from the used absorbent article and supplying the pulp fibers as the material pulp fibers 300 according to another aspect of one or more embodiments will be described. It should be noted that, the supply step S30 is not particularly limited as long as the material pulp fibers 300 derived from the used absorbent article can be supplied, and any method can be employed. As such a step, for example, a step shown below will be described with reference to FIG. 3 and FIG. 4.

Figure 3:
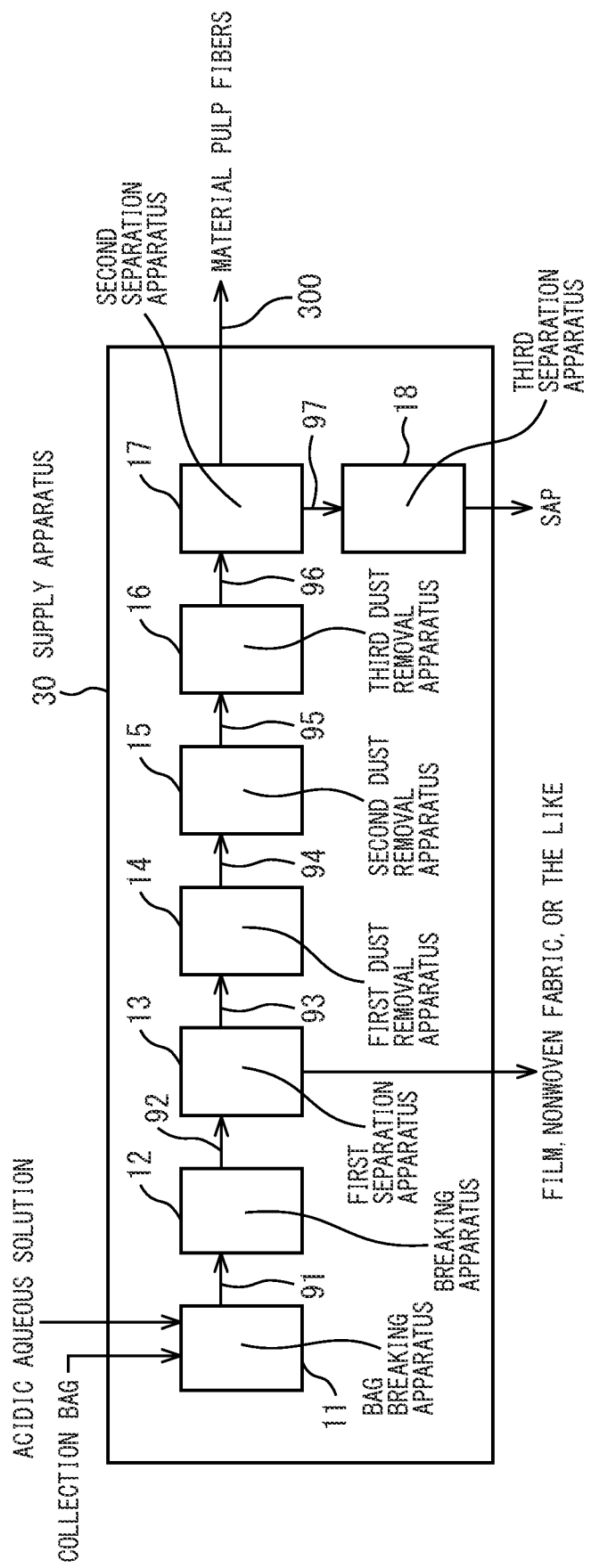
FIG. 3 is a block diagram illustrating a configuration example of an apparatus of supplying conifer-derived material pulp fibers according to one or more embodiments.

FIG. 3 is a block diagram illustrating a configuration example of the supply apparatus 30 that is used in the supply step S30 according to one or more embodiments. FIG. 4 is a flow chart illustrating an example of the supply step S30 according to one or more embodiments. In the supply step S30 (supply apparatus 30), a film, a nonwoven fabric or the like, superabsorbent polymers (SAP), and pulp fibers are separated from the used absorbent article and supplied. In addition, the separation step S10 includes a hole opening step S11 to a third separation step S18 (FIG. 4), and accordingly, the separation apparatus 10 includes a bag breaking apparatus 11 to a third separation apparatus 18 (FIG. 3).

It should be noted that, here, the used absorbent articles are recovered and acquired from the outside and are used for reuse (recycling). At that time, a plurality of the used absorbent articles are enclosed in a collection bag so that excrement, fungi, or odors do not leak to the outside. Each used absorbent article in the collection bag is recovered or the like in a state of being, mainly, rounded or folded such that the top sheet, onto which excrement is excreted, faces inward so as to prevent, for example, the excrement or the fungi from being exposed toward the surface and the odors from diffusing toward the surrounding.

The hole opening step S11 is executed with the bag breaking apparatus 11. The bag breaking apparatus 11 includes a solution tank that stores an inactivation aqueous solution and a bag breaking blade that rotates in the solution tank. The bag breaking apparatus 11 opens a hole in the collection bag put into the solution tank with the bag breaking blade. Thereby, a liquid mixture 91 of the collection bag into which the inactivation aqueous solution has intruded through the holes and the inactivation aqueous solution is generated.

Here, the inactivation aqueous solution will be described. The inactivation aqueous solution inactivates the superabsorbent polymers that are contained in the disposed absorbent article. The inactivated superabsorbent polymers deteriorate in the capability of retaining water and releases water that has been absorbed. Examples of the inactivation aqueous solution include an acidic aqueous solution. An acid in the acidic aqueous solution is not particularly limited, and examples thereof include an inorganic acid and an organic acid. Examples of the inorganic acid include sulfuric acid, hydrochloric acid, and nitric acid, and sulfuric acid is preferable from the viewpoint of not containing chlorine. Examples of the organic acid include a carboxylic acid having a plurality of carboxyl groups (for example, citric acid, tartaric acid, malic acid, succinic acid, or oxalic acid), a carboxylic acid having one carboxyl group (for example, gluconic acid, pentanoic acid, butanoic acid, propionic acid, glycolic acid, acetic acid, or formic acid), a sulfonic acid (for example, methanesulfonic acid, trifluoromethanesulfonic acid, benzenesulfonic acid, or p-toluenesulfonic acid), and the like. As the organic acid, an organic acid having a plurality of carboxyl groups is preferable and citric acid is more preferable from the viewpoint of likelihood of forming a chelate complex with a divalent or higher metal (for example, calcium) contained in excrement or the like and a difficulty in leaving ash in the superabsorbent polymer and the pulp fiber. The citric acid concentration of the acidic aqueous solution is not particularly limited, but is preferably 0.5 to 4 mass %. Hereinafter, a case where an acidic aqueous solution is used as the inactivation aqueous solution will be described as an example.

A breaking step S12 is executed with a breaking apparatus 12. The breaking apparatus 12 includes a biaxial breaker (for example, a biaxial rotary breaker). The breaking apparatus 12 breaks the collection bag including the used absorbent articles in the liquid mixture 91. Thereby, a liquid mixture 92 having broken matters from the collection bag including the used absorbent articles and the acidic aqueous solution is generated, and almost all the superabsorbent polymers in the used absorbent articles are inactivated. Here, the broken matters contain the pulp fibers, the superabsorbent polymers, and other materials (a film, a nonwoven fabric, the collection bag, and the like).

Here, the acidic aqueous solution has a predetermined pH that is acidic (lower than 7.0) and preferably lower than 7.0. The upper limit of the pH is preferably 4.0 and more preferably 3.5. When the pH is too high, the superabsorbent polymers are not sufficiently inactivated, and discharge of excrement held by the superabsorbent polymers is likely to become insufficient. The lower limit of the pH is preferably 0.5 and more preferably 1.0. When the pH is too low, the pulp fibers are likely to be damaged. Here, the pH means a value at 25° C. The pH can be measured using, for example, a pH meter (AS-711 manufactured by HORIBA Co., Ltd.). In addition, the temperature of the acidic aqueous solution is not particularly limited and is, for example, room temperature (25° C.), preferably a temperature higher than room temperature, more preferably 60° C. to 95° C., and still more preferably 70° C. to 90° C. In the case of a high temperature, it becomes easy to sterilize bacteria derived from excrement or the like that is contained in the acidic aqueous solution with the acid in the acidic aqueous solution.

A first separation step S13 is executed with a first separation apparatus 13. The first separation apparatus 13 includes a pulper separator having a stirring and separating tank that functions as a washing tank and a sieving tank. The first separation apparatus 13 separates the pulp fibers, the superabsorbent polymers, excrement, and the acidic aqueous solution from the liquid mixture 92 while stirring the liquid mixture 92 and removing excrement and the like from the broken matters. Thereby, a liquid mixture 93 containing the pulp fibers, the superabsorbent polymers, the excrement, and the acidic aqueous solution is generated, and the films, nonwoven fabrics, the material of the collection bag, and the like of the used absorbent articles are recovered.

It should be noted that, since the superabsorbent polymers from the used absorbent articles are inactivated in the inactivation aqueous solution, the hole opening step S11 and the breaking step S12 (the bag breaking apparatus 11 and the breaking apparatus 12) can be referred to as an inactivation step (inactivation apparatus). In addition, the breaking apparatus 12 may break the used absorbent articles in the collection bag, for example, in an air instead of breaking the used absorbent articles in the inactivation aqueous solution. In such a case, the bag breaking apparatus 11 is not necessary. After the breaking, the broken matters and the inactivation aqueous solution in the breaking apparatus 12 are supplied to the first separation apparatus 13 (first separation step S13), and the superabsorbent polymers are inactivated.

In such a case, the first separation apparatus 13 (first separation step S13) can be referred to as the inactivation step (inactivation apparatus).

A first dust removal step S14 is executed with a first dust removal apparatus 14. The first dust removal apparatus 14 includes a screen separator and separates the liquid mixture 93 into the pulp fibers, the superabsorbent polymers, and the excrement in the acidic aqueous solution and other materials (foreign matters) with a screen. Thereby, a liquid mixture 94 containing the pulp fibers, the superabsorbent polymers, the excrement, and the acidic aqueous solution, which decreases in weight by the amount of the foreign matters, is generated, and the other materials are removed. A second dust removal step S15 is executed with a second dust removal apparatus 15. The second dust removal apparatus 15 includes a screen separator and separates the liquid mixture 94 into the pulp fibers, the superabsorbent polymers, and the excrement in the acidic aqueous solution and other materials (small foreign matters) with a finer screen than the first dust removal apparatus 14. Thereby, a liquid mixture 95 containing the pulp fibers, the superabsorbent polymers, the excrement, and the acidic aqueous solution, which further decreases in weight by the amount of the foreign matters, is generated, and the other materials are further removed. A third dust removal step S16 is executed with a third dust removal apparatus 16. The third dust removal apparatus 16 includes a cyclone separator and separates the liquid mixture 95 into the pulp fibers, the superabsorbent polymers, and the excrement in the acidic aqueous solution and other materials (foreign matters having a heavy specific gravity) by centrifugal separation. Thereby, a liquid mixture 96 containing the pulp fibers, the superabsorbent polymers, the excrement, and the acidic aqueous solution, which further decreases in weight by the amount of the foreign matters, is generated, and the other materials having a large specific gravity are removed. It should be noted that, depending on the state of the liquid mixture 92 or the like (for example, the amount or size of the foreign matters), at least one of the first dust removal apparatus 14 through the third dust removal apparatus 16 may not be provided.

A second separation step S17 is executed with a second separation apparatus 17. The second separation apparatus 17 includes a drum screen separator and separates the liquid mixture 96 into the superabsorbent polymers in the acidic aqueous solution and the pulp fibers with a drum screen. Thereby, a liquid mixture 97 containing the superabsorbent polymers, the excrement, and the acidic aqueous solution is generated, and the pulp fibers are extracted as the material pulp fibers 300. It should be noted that a third separation step S18 is executed with a third separation apparatus 18. The third separation apparatus 18 includes an inclined screen and separates the liquid mixture 97 into a solid containing the superabsorbent polymers and a liquid containing the excrement and the acidic aqueous solution with the screen. Thereby, superabsorbent polymers (SAP) is generated, and an acidic aqueous solution containing excrement or the like is removed.

Generally, as the pulp fibers derived from a used absorbent article, conifer-derived pulp fibers are used. Therefore, in one or more embodiments of the present invention, as the conifer-derived material pulp fibers 300, pulp fibers derived from used absorbent articles are supplied to the beating step S31. That is, in the present aspect, in order to reduce an environmental load, pulp fibers derived from used absorbent articles can be reused. In this case, there is a possibility that the pulp fibers derived from a used absorbent article contain excrement or superabsorbent polymers as an impurity, and there is a risk that the properties of paper may be adversely affected. However, in the present aspect, since the surfaces of the material pulp fibers 300 are fluffed and the insides are exposed by the beating step S31, such impurity attached to the surfaces or insides of the material pulp fibers 302 are easily oxidatively decomposed and solubilized in water by the subsequent ozone treatment step S33, which makes it possible to remove the impurity from the material pulp fibers 302. This makes it possible to more reliably obtain the synergistic effect of the beating step S31 and the ozone treatment step S33 even when pulp fibers derived from used absorbent articles are used as the material pulp fibers 300, which makes it possible to produce conifer-derived pulp fibers for paper that can be used as a material for high-quality paper.

As described above, pulp fibers can be separated from used absorbent articles and supplied as the material pulp fibers 300.

EXAMPLES

Hereinafter, embodiments of the present invention will be described based on examples, but the present invention is not limited to the examples.

(1) Evaluation of Method of Producing Pulp Fibers for Paper
(1-1) Raw Materials
The following pulp fibers were prepared as raw materials.
Raw material A: Conifer kraft pulp (NBKP) manufactured by Weyerhaeuser. This raw material A (conifer kraft pulp) can also be considered as pulp fibers of used absorbent articles.
Raw material B: Hardwood kraft pulp (LBKP) manufactured by Cenibra S. A.
(1-2) Sample
The following samples were prepared using the above-described raw materials.
Example 1: Raw material A on which a beating step S31 to an ozone treatment step S33 had been performed.
Comparative Example 1: Raw material A (blank)
Comparative Example 2: Raw material A on which only the ozone treatment step S33 had been performed.
Comparative Example 3: Raw material A on which only the beating step S31 had been performed.
Comparative Example 4: Raw material B Here, as the conditions of the beating step S31, the blade width, the groove width, and the angle were set to 4 mm, 5 mm, and 8°, respectively, the rotation speed was set to 800 rpm, the inlet pressure/outlet pressure was set to 0.078 MPa/0.096 MPa, the number of times of passing was set to 4, and the beating step S31 was performed at room temperature.

In addition, as the conditions of the ozone treatment step S33, the CT value was set to 3000 (200 ppm by mass×15 minutes), and the ozone treatment step S33 was performed at room temperature.

It should be noted that, as a solution and ozone water in the beating step S31, an acidic aqueous solution, specifically, a citric acid aqueous solution was used.

(1-3) Evaluation Method
(a) Canadian Standard Freeness
For the samples of Example 1 and Comparative Examples 1 to 4, the Canadian standard freeness (hereinafter, also simply referred to as "freeness") was obtained. A method of measuring the freeness will be described below.

(b) Length-Loaded Average Fiber Length

For the samples of Example 1 and Comparative Examples 1 to 4, the length-loaded average fiber lengths were obtained. A method of measuring the length-loaded average fiber length will be described below.

(1-4) Evaluation Results (a) Freeness

Regarding the samples of Example 1 and Comparative Examples 1 to 4, the evaluation results of the freeness are shown in Table 1.

When only an ozone treatment was performed on the pulp fibers, the freeness became high, and thus it became difficult for the pulp fibers to retain water (Comparative Example 2). The reasons therefor are considered as the weakening of hydrogen bonds between the pulp fibers and water attributed to the oxidization of hydroxyl groups in the pulp fibers, the progress of the fibrillation of the pulp fibers attributed to the decomposition of lignin that was contained in the pulp fibers, suppression of the swelling of the pulp fibers attributed to the decomposition of hemicellulose that was contained in the pulp fibers, and the like.

On the other hand, when only a beating treatment was performed on the pulp fibers, the freeness became low, and thus it became easy for the pulp fibers to retain water (Comparative Example 3). The reason therefor is considered that the fine powder of the pulp fibers generated by the beating treatment retained water.

In Example 1, a beating treatment was performed on the pulp fibers, and then an ozone treatment was performed. Therefore, the fine powder or small pieces of the pulp fibers generated by the beating treatment became easy to be detached from the pulp fibers by the ozone treatment and were removed during dehydration after the ozone treatment, and thus the freeness of the pulp fibers could be increased in association with the intrinsic effect of the ozone treatment. In addition, the freeness of the produced pulp fibers could be made substantially the same as the freeness of conifer kraft pulp (Comparative Example 1) or hardwood kraft pulp (Comparative Example 4), in other words, 500 CSF ml or more. That is, the freeness of the generated pulp fibers for paper was approximately 500 to 700 CSF ml and approximately 550 to 650 CSF ml.

Here, the pulp fibers after the beating treatment (Comparative Example 3) had a low freeness of 335 CSF ml and were likely to retain water and hard to be dehydrated; however, the pulp fibers on which the ozone treatment was additionally performed (Example 1) had a high freeness of 555 CSF ml, were unlikely to retain water, and had an increased dehydration efficiency. Therefore, pulp fibers made to contain a small amount of water (moisture rate: approximately 50%) could be produced by dehydrating such pulp fibers (Example 1), which made it possible to produce pulp fibers having a small weight. Therefore, the transport efficiency could be enhanced by transporting the pulp fibers having a small weight as a material.

TABLE 1

| Sample | Freeness (CSF) |
| --- | --- |
| Example 1 (beating + ozone) | 555 |
| Comparative Example 1 (blank: NBKP) | 731 |
| Comparative Example 2 (ozone) | 768 |
| Comparative Example 3 (beating) | 335 |
| Comparative Example 4 (LBKP) | 637 |

(b) Length-Loaded Average Fiber Length

Regarding the samples of Example 1 and Comparative Examples 1 to 4, the evaluation results of the length-loaded average fiber lengths are shown in Table 2 and Table 3. It should be noted that, in Table 2 and Table 3, the same samples are measured twice in Example 1 and Comparative Examples 1 and 4.

It was confirmed that, when only the beating treatment was performed on the pulp fibers, the length-loaded average fiber length became extremely short (decreased by approximately 30%), and the pulp fibers were cut or fibrillated (Table 2: Comparative Example 3). On the other hand, it was assumed that, when only the ozone treatment was performed, the length-loaded average fiber length did not significantly change (decreased by approximately 10%), and the decomposition of lignin, hemicellulose, or the like or the fibrillation of the pulp fibers occurred (Table 3: Comparative Example 2).

In Example 1, the beating treatment was performed on the pulp fibers in advance, whereby the pulp fibers were shortened and fibrillated to increase the surface area and expose the insides, which made it possible to increase the effect of the subsequent ozone treatment. In addition, the ozone treatment was performed afterward, whereby the decomposition of lignin, hemicellulose, or the like or the fibrillation of the pulp fibers was further progressed, and the fine powders and small pieces of the pulp fibers generated by the beating treatment could be removed. This made it possible to suppress the fiber lengths becoming too small even when both the beating treatment and the ozone treatment were performed. Therefore, the length-loaded average fiber length of the produced pulp fibers could be set to a value between those of conifer kraft pulp (Comparative Example 1) and hardwood kraft pulp (Comparative Example 4). That is, the length-loaded average fiber length of the generated pulp fibers for paper was approximately 1.6 to 2.1 mm and 1.8 to 2.0 mm.

TABLE 2

| | Example 1 (beating + ozone) | Comparative Example 1 (blank: NBKP) | Comparative Example 2 (ozone) | Comparative Example 4 (LBKP) |
| --- | --- | --- | --- | --- |
| Length-loaded average fiber length | 1.94 | 2.45 | 1.76 | 0.99 |

TABLE 3

| | Example 1 (beating + ozone) | Comparative Example 1 (blank: NBKP) | Comparative Example 2 (ozone) | Comparative Example 4 (LBKP) |
| --- | --- | --- | --- | --- |
| Length-loaded average fiber length | 1.91 | 2.35 | 2.18 | 0.90 |

(2) Evaluation of Paper Manufactured Using Pulp Fibers for Paper (2-1) Sample

Samples of the following papers were prepared by the following manufacturing method using the pulp fibers of Example 1, Comparative Example 1, and Comparative Example 2.

(a) Method of Producing Paper (1) The pulp fibers of any of Example 1, Comparative Example 1, and Comparative Example 2 are prepared. (2) Paper is made by a hand-making method so that 100% of the pulp fibers that configure the paper are the pulp fibers prepared in the (1). At that time, the paper is made such that the basis weight of the paper becomes approximately 50 g/m² and the shape of the paper becomes 25 cm×25 cm square. The paper was made using a square sheet machine (250 mm×250 mm) (No. 2555: manufactured by Kumagai Riki Kogyo Co., Ltd.)

(b) Samples of Paper

Example 2: Paper obtained by the above-described manufacturing method using the pulp fibers of Example 1.

Comparative Example 5: Paper obtained by the above-described manufacturing method using the pulp fibers of Comparative Example 1.

Comparative Example 6: Paper obtained by the above-described manufacturing method using the pulp fibers of Comparative Example 2.

(2-2) Evaluation Method (a) Basis Weight, Thickness, Density, and Bending Resistance Regarding the samples of Example 2, Comparative Example 5, and Comparative Example 6, the basis weights, thicknesses, densities, and bending resistance were obtained. Methods for measuring the basis weight, thickness, density, and bending resistance will be described below.

(b) Smoothness

Regarding the samples of Example 2, Comparative Example 5, and Comparative Example 6, the smoothness was obtained. The smoothness was measured by sensory evaluation from a tactile feel and the impression of physical appearance.

(c) Relationship Between Tensile Elongation and Strength

Regarding the samples of Example 2, Comparative Example 5, and Comparative Example 6, the relationship between tensile elongation and strength was obtained. The method of measuring the relationship between tensile elongation and strength will be described below.

(2-3) Evaluation Results (a) Basis Weight, Thickness, Density, and Cantilever

Regarding the samples of Example 2, Comparative Example 5, and Comparative Example 6, the evaluation results of the basis weights, thicknesses, densities, and bending resistance are shown in Table 4.

The thickness of the paper (Comparative Example 6) was decreased by the use of the pulp fibers on which the ozone treatment had been performed (Comparative Example 2), and the thickness of the paper (Example 2) was further decreased by the use of the pulp fibers on which the ozone treatment and the beating treatment had been performed (Example 1). This is considered to be attributed to the progress of fibrillation. Accordingly, the density of the paper (Comparative Example 6) was also increased by the use of the pulp fibers on which the ozone treatment had been performed (Comparative Example 2), and the density of the paper (Example 2) was further increased by the use of the pulp fibers on which the additional ozone treatment and the beating treatment had been performed (Example 1). That is, it was clarified that paper having an extremely high density was obtained by using the pulp fibers of Example 1 (Example 2). That is, hand-made paper manufactured by setting the blending amount of generated pulp fibers for paper to 90 mass % or more had a density of 300 kg/m³ or higher (basis weight: 52 g/m² or more, thickness: 0.17 mm or less). However, regarding the bending resistance, since the density was high, but the fiber lengths were short in Example 2, and the density was low, but the fiber lengths were long in Comparative Example 6, the bending resistance became high in both cases and became approximately the same.

(b) Smoothness

Regarding the samples of Example 2, Comparative Example 5, and Comparative Example 6, the evaluation results of the smoothness are shown in Table 4. Here, high smoothness is indicated by O, and low smoothness is indicated by X.

It was confirmed from the tactile feel and the impression of physical appearance that, in a case where the density was low (Comparative Examples 5 and 6), fluff on the surface of the paper was noticeable, and the surface was felt rough; however, in a case where the density was high (Example 2), fluff on the surface of the paper was significantly decreased, the surface was felt smooth, and the smoothness was enhanced.

TABLE 4

|  | Example 2 (beating + ozone) | Comparative Example 5 (blank: NBKP) | Comparative Example 6 (ozone) |
|---|---|---|---|
| Basis weight (g/m²) | 52.8 | 51.3 | 50.4 |
| Thickness (mm) | 0.16 | 0.23 | 0.20 |
| Density (kg/m³) | 330 | 223 | 252 |
| Bending resistance (mm) | 131 | 97 | 130 |
| Smoothness | O | X | X |

(c) Relationship Between Tensile Elongation and Strength

Regarding the samples of Example 2, Comparative Example 5, and Comparative Example 6, the evaluation results of the relationship between tensile elongation and strength are shown in Table 5.

Regarding the elongation 3% strength, tensile strength, and maximum elongation of the paper, compared with the paper (Comparative Example 5) for which the blank pulp fibers (Comparative Example 1) were used and the paper (Comparative Example 6) for which the ozone-treated pulp fibers (Comparative Example 2) were used, the paper (Example 2) for which the pulp fibers on which the ozone treatment and the beating treatment had been performed (Example 1) were used showed extremely large values. Therefore, it was clarified that paper having an extremely high tensile strength and an extremely high maximum elongation could be obtained by using the pulp fibers of Example 1 (Example 2). That is, the hand-made paper manufactured by setting the blending amount of generated pulp fibers for paper to 90 mass % or more had an elongation 3% strength of 10 N/25 mm or higher, a maximum elongation degree of 5% or higher, and a tensile strength of 35 N/25 mm or higher.

TABLE 5

|  | Example 2 (beating + ozone) | Comparative Example 5 (blank: NBKP) | Comparative Example 6 (ozone) |
|---|---|---|---|
| Elongation 3% strength (N/25 mm) | 31.0 | 0.1 | 0.9 |
| Tensile strength (N/25 mm) | 43.0 | 4.4 | 8.6 |
| Maximum elongation (%) | 7.0 | 1.3 | 2.1 |

In the method of producing conifer-derived pulp fibers for paper of one or more embodiments (Example 1), first, in the beating treatment (beating step S31), the material pulp fibers are fibrillated while the fiber lengths of the material pulp fibers are adjusted to be short. Next, in the ozone treatment (ozone treatment step S33), the fibrillation of the material pulp fibers is further progressed, the specific surface area of the material pulp fibers is further increased, and lignin, other impurities, and the like on the surfaces or insides of the material pulp fibers are oxidatively decomposed, solubilized, and removed. Therefore, in the produced pulp fibers for paper, the pulp fibers are likely to be entangled, and the entanglement is unlikely to be untangled. In addition, the ozone treatment increases the freeness of the pulp fibers for paper, and water drainage becomes favorable. This is considered to be because hydroxyl groups on the surfaces of the material pulp fibers are oxidized, which weakens the hydrogen bonds between water and the pulp fibers for paper. Therefore, paper can be made by using the pulp fibers for paper in a large blending amount (for example: 90 to 100 mass %). It should be noted that, in a case where only the ozone treatment was performed, only paper having an extremely low tensile strength could be made (Comparative Example 6), and, in a case where only the beating treatment was performed, the freeness was excessively low (Comparative Example 3), and water drainage was extremely poor, which made it impossible to make paper using such pulp fibers in a high blending amount (for example, 90 to 100 mass %).

<Canadian Standard Freeness>

The Canadian standard freeness (CSF ml) was measured in accordance with JIS P8121-2: 2012 Pulps-Determination of drainability—Part 2: Canadian Standard freeness method.

The schematic order of the Canadian standard freeness method is as follows.

(1) A filtered water bottle is attached to the arm of a support table, the lower lid is closed, and an air cock on the upper lid is opened.

(2) A measuring cylinder is placed at a position where the measuring cylinder is capable of receiving water discharged from a side pipe.

(3) A sample (1000 mL) is accurately weighed and collected in a 1000 mL measuring cylinder. Here, the sample was prepared in accordance with "sample preparation of pulp that is not in a slurry state" of the above-described JIS method. (4) The contents in the measuring cylinder are gently poured into the filtered water bottle.

(5) After five seconds from the end of the pouring of the sample, an air cock is opened to make the sample flow down.

(6) Once the water discharge from the side pipe stops, the amount of water discharged from the side pipe is read.

(7) This amount of water discharged is corrected to a value at a standard concentration of 0.30% and a standard temperature of 20° C. according to a correction table (Appendix Tables 1 and 2), and this value is defined as the Canadian standard freeness, that is, the freeness (CSF ml).

<Length-Loaded Average Fiber Length>

The length-loaded average fiber length (mm) was measured with a Valmet fiber image analyzer (Valmet FS5 manufactured by Valmet Corporation).

The schematic order of a method of measuring the length-loaded average fiber length is as follows.

(1) The pulp fibers are put into a beaker in an appropriate amount. In addition, approximately half of the beaker is filled with water.

The amount of the pulp fibers is adjusted such that the number of the pulp fibers per second becomes 5 to 90 at the time of measurement (2) below.

(2) The sample is set in Valmet FS5, measurement conditions are set, and measurement is started.

(3) After the prescribed number of the fibers are measured, the measurement is terminated, and the value of L (I) is defined as the length-loaded average fiber length (mm).

<Basis Weight, Thickness, and Density of Paper>

The basis weight ($g/m^2$), thickness (mm), and density ($kg/m^3$) of the paper were measured by the following method.

(1) Basis weight of paper: The paper is cut into a size of 5 cm×5 cm to prepare a sample, and the mass is measured after a drying treatment in an atmosphere of 100° C. or higher. The measured mass is divided by the area of the sample to calculate the basis weight of the sample. The value obtained by averaging the basis weights of 10 samples is defined as the basis weight ($g/m^2$) of the paper.

(2) Thickness of paper: The thickness of the paper is measured using a thickness meter (FS-60DS, manufactured by Daiei Kagaku Seiki MFG. Co., Ltd.) equipped with a 15 $cm^2$ measuring probe under a condition of a measurement load of 3 $g/cm^2$. The thickness is measured at three portions in one sample, and the average value of the thicknesses of the three portions is defined as the thickness (mm) of the paper.

(3) Density of paper: The density of the paper is calculated by dividing the basis weight of the paper obtained by the above-described method by the thickness of the paper obtained by the above-described method and is defined as the density ($kg/m^3$) of the paper.

<Bending Resistance>

The bending resistance (mm) was measured in accordance with JIS L 1096: 2010 8. 21. 1A method (45° cantilever method).

The schematic order of a method of measuring the bending resistance is as follows.

(1) Paper that is a measurement object is cut into a piece having a width of 25 mm and a length of 150 mm and used as a sample. (2) The sample is set in a cantilever bending resistance testing apparatus (CAN-1MCA, manufactured by Daiei Kagaku Seiki MFG. Co., Ltd.) and measured under a measurement condition of a movement rate: 5 mm/sec.

(3) In different samples, the bending resistance is measured five times with one surface facing upward and measured five times with the other surface facing upward, and the average value thereof is employed as the bending resistance.

<Tensile Strength and Tensile Elongation of Paper>

A schematic order of a method of measuring the tensile strength (N/25 mm) and tensile elongation (%) of the paper is as follows.

(1) Paper that is a measurement object is cut into a piece having a width of 25 mm and a length of 160 mm and used as a sample. (2) The sample is set in a tensile tester equipped with a load cell having a maximum load capacity of 50N (AUTOGRAPH AGS-1kNG, manufactured by Shimadzu Corporation), and the elongation and the strength are measured under conditions of a chuck-to-chuck distance of 100 mm and a tensile rate of 100 mm/min.

(3) The relationship between the elongation and the strength is measured, an elongation at which the strength is maximized is defined as the maximum elongation, and the strength at the maximum elongation is defined as the tensile strength. The same measurement is performed on five samples, and the average value thereof is defined as the maximum elongation (%) and the tensile strength (N/25 mm). In addition, a strength at which the elongation becomes 3% is defined as the elongation 3% strength (N/25 mm).

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

REFERENCE SIGNS LIST

S31: Beating step
S33 Ozone treatment step

The invention claimed is:

1. A method of producing conifer-derived pulp fibers for paper, the method comprising:
   a deriving step of deriving conifer-derived pulp fibers from used absorbent articles;
   after the deriving step, a supply step of supplying the conifer-derived pulp fibers as conifer-derived material pulp fibers;
   a beating step of beating the conifer-derived material pulp fibers supplied by the supply step in the presence of a liquid including water to form beaten material pulp fibers; and
   an ozone treatment step of treating the beaten material pulp fibers with ozone water to form pulp fibers for paper.

2. The producing method according to claim 1, wherein the beating step includes:
   a step of beating the conifer-derived material pulp fibers in the presence of an acidic aqueous solution as the liquid.

3. The producing method according to claim 1, further comprising:
   a transfer step of transferring the beaten material pulp fibers to an ozone treatment step while the beaten material pulp fibers are continuously held in the acidic aqueous solution used in the beating step.

4. The producing method according to claim 1, further comprising:
   a transfer step of transferring the beaten material pulp fibers to the ozone treatment step together with the liquid used in the beating step.

5. The producing method according to claim 1, wherein the beating step includes:
   a step of beating the conifer-derived material pulp fibers with a conical refiner.

6. The producing method according to claim 1, wherein in the ozone treatment step,
   an ozone concentration of the ozone water is 1 to 200 ppm by mass,
   a treatment time in the ozone water is 5 to 120 minutes, and
   a product of the ozone concentration and the treatment time is 100 to 6000 ppm minute.

7. The producing method according to claim 1, wherein a length-weighted average fiber length of the pulp fibers for paper after the ozone treatment step is 1.6 to 2.1 mm.

8. The producing method according to claim 7, wherein a Canadian standard freeness of the pulp fibers for paper after the ozone treatment step is 500 CSF ml or more.

* * * * *